W. S. MEAD.
Assignor to THE MEAD REGENERATIVE GAS BURNER COMPANY.
REGENERATIVE GAS BURNER.
No. 10,899. Reissued Feb. 7, 1888.
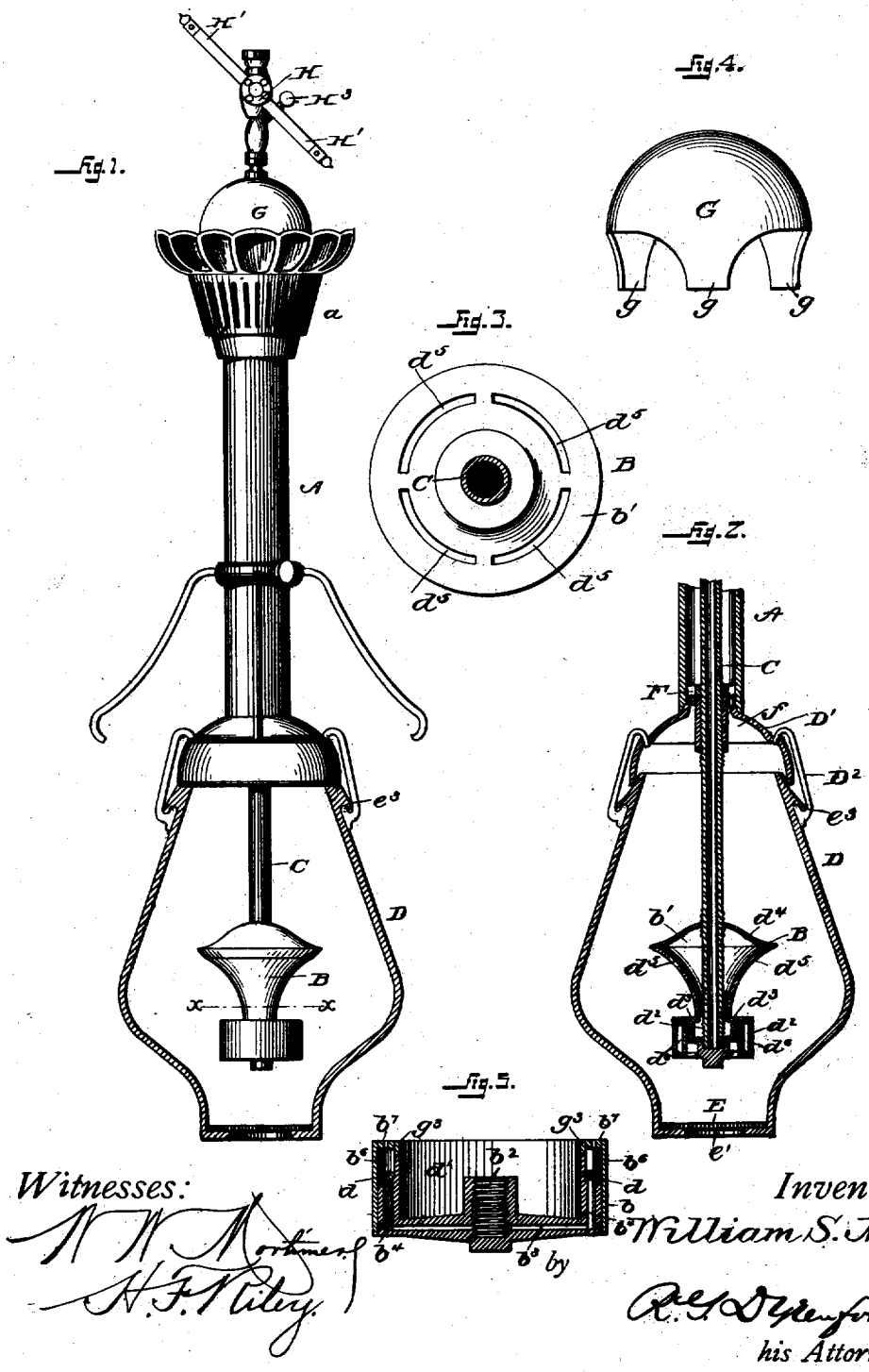
Witnesses:
W. W. Mortimer
H. F. Riley
Inventor:
William S. Mead,
by R. S. Dyrenforth,
his Attorney.
N. PETERS, Photo-Lithographer, Washington, D. C.

UNITED STATES PATENT OFFICE.

WILLIAM STODDARD MEAD, OF PHILADELPHIA, PENNSYLVANIA, ASSIGNOR TO THE MEAD REGENERATIVE GAS BURNER COMPANY, OF NEW YORK, N. Y.

REGENERATIVE GAS-BURNER.

SPECIFICATION forming part of Reissued Letters Patent No. 10,899, dated February 7, 1888.

Original No. 354,564, dated December 21, 1886. Application for reissue filed January 31, 1887. Serial No. 226,045.

*To all whom it may concern:*

Be it known that I, WILLIAM STODDARD MEAD, a citizen of the United States, residing at Philadelphia, in the county of Philadelphia and State of Pennsylvania, have invented certain new and useful Improvements in Regenerative Gas-Burners; and I do hereby declare the following to be a full, clear, and exact description of the invention, such as will enable others skilled in the art to which it appertains to make and use the same.

My invention relates to burners or lamps, and has for its object to promote economy in the consumption of illuminating-gas, to fully develop the flame, and to produce a clear, steady, and brilliant light.

My invention, generally speaking, consists of certain novel features and combinations of features in said burners or lamps. These novel features and combinations will be pointed out specifically in the claims concluding this specification.

In the accompanying drawings I have illustrated a burner or lamp involving my several improvements; but these improvements may be employed severally as well as conjointly, and they may be applied to other types of burners than that so illustrated and described herein.

Referring to said drawings, Figure 1 is a side view of an improved burner of the type known as "regenerative burners," having the glass globe sectioned centrally and vertically. Fig. 2 is a central vertical section of the same, with the upper part of the chimney broken away. Fig. 3 is a transverse section on the line *x x*, Fig. 1, looking toward the top of the return-flue. Fig. 4 is a side view of the dome or cap, the same being shown detached. Fig. 5 is a vertical diametrical section of the burner proper.

The following is a description of said drawings:

A is a stack or chimney for inclosing the gas-pipe C, and for heating the gas contained therein on its way to the burner, and said stack or chimney has for ornamentation the appearance of a column, including its capital *a*.

*b* is the burner proper, (shown in detail at Fig. 5,) which is suspended by means of the gas-supply pipe C, in practice connected to the service-pipe, and passing down through the stack or chimney A.

*b'* is a return-flue for receiving the hot-air and products of combustion after they leave the flame, and returning them again into contact with the flame, as will be hereinafter particularly described. This flue is extended up above the burner proper, and preferably forms a spreader, which projects laterally in order to spread and enlarge the volume of the gas as it flows through the apertures, as shown, thus rendering the volume of the gas uniform and the flame clear and brilliant throughout its entire length.

The burner *b* is provided, for its connection to the gas-pipe C, with a central internally-threaded nozzle or boss, $b^2$. From this nozzle a series of radial gas-passages, $b^3$, extending through the arms of the spider or spoke-like bottom of the base or combustion-chamber, extend or lead to a narrow deep annular chamber, $b^4$. The outer wall of the burner *b* consists of a cylindrical casing, $b^6$, which is spun or formed in the shape shown, the inner depending edge, $g^3$, thereof resting upon the upper edge of the inner wall of said burner.

*d* is an annulus or deflector fitted upon an offset or shoulder of the inner wall of the burner *b*, and arranged within the enlargement of the chamber $b^4$, formed by the casing $b^6$, and slightly above the upper edge of the wall $b^8$ of the burner, providing a narrow passage-way between the upper edge of said wall and itself, and a still narrower passage-way between the casing $b^6$ and itself, whereby the gas leaving the chamber $b^4$ will be deflected into the upper compartment of the enlargement of the said chamber $b^4$ into a thin film or sheet, whence it escapes in like manner through the apertures $b^7$ in the upper flanged edge of the casing $b^6$ for ignition. Thus the ignited gas issuing from the top edge of the casing $b^6$ will be converted into a fully-developed bowl or wall-shaped flame of great brilliancy, which latter is due, however, in a measure, to the construction of parts hereinafter described.

The return-flue *b'*, through which the hot air and products of combustion are conducted into contact with the flame again, is shown as being provided with a cylindrical lower end, $d^2$, screwed upon the gas-pipe C within a central compartment, $d'$, of the burner $b$, and down upon the upper edge of the nozzle $b^2$, the same thus providing a narrow passage-way, $d^3$, between itself and the inner wall of the burner for the passage and admission of air from below between the lugged openings, as also the hot air and products of combustion, as hereinafter described, delivered through the return-flue $b'$ to feed the flame.

At the sides of the cylindrical lower end, $d^2$, of the hot-air chamber $b'$ is provided a series of passages, slots, or apertures, $d^6$, for the passage from said chamber of hot air and products of combustion back to the flame of the burner, the said air and products passing into the passage $d^3$, there mingling with the fresh air entering through the bottom of the burner and flowing with it up to the flame. The return-flue $b'$ is flared from a contraction of itself immediately adjoining said lower cylindrical end, $d^2$, upward, which flared portion is covered at its upper edge by a dome, $d^4$. This dome is screwed upon the gas-pipe C.

In the sides of the return-flue $b'$, up near its top, is a series of apertures or segmental slots, $d^5$, arranged at short intervals apart around the said chamber for the admission of air and products of combustion given off by the flame. The entire periphery of the said return-flue is preferably silvered, nickel-plated, or enameled, in order to better reflect the light, and thus enhance the efficiency of the flame. The flared surface of said return-flue has the effect to deflect and spread, and thus enlarge the flame. It also causes the air to impinge upon the flame throughout its entire height, and thereby avoids the areas of diminished luminosity apparent in ordinary flames.

It will here be remarked that it has been found by actual experiment that after the flame of the burner has been lighted and the draft through the bottom of the globe D, up and out through the chimney A, has been properly established a current will flow continuously down through the flue $b'$. In other words, the hot-air and imperfectly-consumed products of combustion ascending from the flame will enter the passages $d^5$ at the top of said flue, flow down through the flue, and pass out through the apertures $d^6$, and then up again into contact with the flame.

D is the globe or chimney, which may be of the form shown, or other suitable shape, and which is suspended below an approximately bell-shaped cap, D′, secured to the lower end of the chimney or stack A. The bell-shaped cap D′, being constructed to limit the draft, and hence the supply of air, by closing by means of radial arms or spokes disposed in the upper part of the bell, has a tendency to mellow the flame and to prevent the bluish color of flame which would otherwise be produced; and in this connection the dome disposed on top of the capital $a$ also retards the flow of the air, and thus serves as an adjunct in preventing its too great supply.

It will be observed that sufficient air passes up through the lower part of the burner and becomes heated, and is deflected against the flame, near its apex, to cause the upper part of the flame to become as brilliant as its central part. The suspension of the globe is effected by means of the hooks $D^2$, the upper ends of which may be swaged or riveted upon a step or shoulder of the cap D′, and the lower ends of said hooks catching in sockets $e^3$, formed in the outer upper surface of the chimney. The chimney D is also (unlike other devices hitherto constructed) tapered inward in diameter toward the burner near its lower part, as shown, and projects down beneath the same, thus admitting the light to project down and beneath the burner and preventing the shadow which is ordinarily thrown beneath a lamp, the globe being turned inward at the bottom to form a flange as a bearing for a perforated metallic or glass plate. In the lower end or bottom of the globe D is a circular air opening or passage, $e'$, and upon said bottom or lower end is placed or supported a foraminated or perforated metallic or glass plate, E, covering the opening, the purpose of the plate being to distribute or diffuse the incoming air, and which also has the effect, measurably, to abate or break the force of the draft.

I do not confine myself strictly to the use of the hooks $d^2$ for suspending the globe, or to the other precise features of construction herein described, as any suitable and equivalent devices may be employed.

Within the lower end of the chimney or stack are also disposed a spider, F, which is connected to and supported upon the gas-pipe C by means of a sleeve, to which its arms are connected, the sleeve being screwed upon the gas-pipe. The spider also effects the abatement or reduction of the draft.

G is a dome or cap of hemispherical or other suitable form. By the removal of segments from the lower edge of this dome are formed feet or short legs $g$, the recesses or openings between which also forming air-passages, and the feet resting upon the upper edge of the chimney or stack A or upon the inner edge of the capital $a$, as will be readily understood by the drawings. In common with the parts $e'$ and F the dome is also contrived for the partial abatement of the draft, whereby it will be seen that the draft is perfectly controlled or regulated and uniformly or evenly distributed throughout the burner properly to feed the flame, while the combustion is augmented by the hot air and imperfectly-consumed products of combustion passing through the flue $b'$, thus securing a maximum illumination with the consumption of a minimum quantity of gas, which lessens the accumulation of imperfectly-consumed products of combustion—as soot, smoke, &c.—and economizes expense and labor and trouble in keeping the lamp clean.

H is an ordinary gas valve or cock supplied to the gas-pipe above the dome or roof G for cutting off or turning on the supply of gas. To the outer end of the key or plug of this valve is applied a lever, H′, with two long arms to effect the ready actuation or turning of the valve, to the ends of which lever are, in practice, connected cords, chains, or wires for a ready manipulation of the lever in opening and closing the valve. In either arm of the lever H′ is provided a suitably-threaded orifice adapted for reception of a corresponding set-screw, $h^3$, therein disposed, with which the cock H is adjusted to regulate the flow of gas at night and also its flow in the day-time, allowing escape of a small quantity thereof for producing a blue flame.

The cap *f* immediately beneath the lugs F is enlarged in diameter in order that it may project out, and thus prevent too great flow of air out through the apertures at the top of the dome of the hot-air chamber.

I will now proceed to describe more specifically the operation and function of the return-flue *b′*, which constitutes one of the principal features of my present improvement. The object of this return-flue is to receive and collect a part of the escaping imperfectly-consumed products of combustion and the heated air as they rise from the flame and to return them again into contact with said flame. The effect of this is to avoid waste and to insure a more complete combustion and utilization of all the particles of the gas. It also economizes heat and thereby improves the light, because a portion of the gases heated by the flame instead of going directly out of the flue is brought back into contact with the flame again, furnishing it with a hot blast without the application of additional heat and with a minimum expenditure of energy.

The operation of the device herein illustrated, by means of which these results are obtained, may be thus described: When the burner is in operation, a current of air, due to the heat generated in the burner, is caused to flow through the inclosing-globe D, entering at the bottom of said globe and passing out at the top. A portion of this current flows on the inside of the annular burner *b*, between the exterior walls of the return-flue *b′* and the interior walls of said annular burner. The lower passages, $d^6$, from the flue *b′* are so directed that this current of air passing up around the lower end of said flue will, according to well-established and well-known principles, drag the air out of the lower end of said flue, thereby causing at that point a partial vacuum, which will be relieved by the descent of the gases contained in the upper part of said flue, and a current entering said flue at the top through the apertures $b^5$ will thus be established. The apparatus therefore acts as an injector. It is therefore obvious that as long as a current of air flows around the lower end of said flue a descending current will flow through said flue. It will also be observed that the products of combustion and heated air as they leave the top of the flame are in motion and are somewhat hotter than the gases contained within said flue, and the pressure of these external gases, due to their heat and inertia, will, therefore, aid the drawing action heretofore explained in maintaining and accelerating said downward current.

I do not confine myself to the employment of the specific means or devices described and illustrated for causing a downward current to flow through a return-flue, *b′*. Nor do I confine myself to the form or position of said flue, or the combination of said flue with the type of burner herein illustrated and described.

The receiving-apertures of the flue should be arranged to communicate with the heated gases after they have left the flame, and the discharging-apertures should be arranged to communicate with the fresh air on its way to the flame. In order to secure this result the said apertures are, in the burner illustrated in the drawings, respectively located above and below the flame; but their positions in other forms of burners may be modified or reserved to fulfill the functions indicated, and said terms in this specification will be read with this explanation.

It will be understood that I do not limit myself to the precise construction or arrangement or combination of any of the devices herein shown and described, as it is obvious that numerous changes in the details may be made without departing from either the spirit or scope of my invention.

Having thus fully described my invention, what I claim, and desire to secure by Letters Patent, is—

1. The combination of an annular burner and a passage or flue passing down through the center of the flame of said burner, said flue being provided with receiving-apertures located between said flame and the outlet for the discharge of heated gases given off by said flame, and discharging-apertures located between said flame and the inlet, through which fresh air is admitted to said flame, substantially as described.

2. The combination of an annular burner and a passage or flue provided with receiving-apertures located between the flame of said burner and the outlet for the discharge of the heated gases given off by said flame, and discharging-apertures located between said flame and the inlet, through which fresh air is admitted and in communication with said fresh air introduced upon the inner mantel of said flame, substantially as described.

3. The combination of an annular burner, a hollow deflector forming a passage or flue passing down through the center of the flame of said burner, said flue being provided with receiving-apertures located between said flame and the outlet for the discharge of heated gases given off by said flame, and discharging-apertures located between said flame and the inlet, through which fresh air is admitted to said flame, substantially as described.

4. The combination of a burner and a passage or flue provided with receiving-apertures located between the flame of said burner and the outlet for the discharge of the heated gases given off by said flame, and discharging-apertures located between said flame and the inlet, through which fresh air is admitted to said flame, thus acting as an injector, substantially as described.

5. The combination, with an Argand gas-burner, of a regenerative chamber constructed with projection at the top and a base connecting with the burner, there being passage from the base to the burner, said chamber being provided with openings at or near the top and openings at the bottom, substantially as set forth.

6. The combination, with an Argand gas-burner, of the central regenerative chamber with outward-extending top and a base fitting within the burner, leaving a passage between the base and the inner wall of the burner, said chamber being provided with openings at or near the top and openings at the bottom, and a gas-supply pipe passing through the regenerative chamber, substantially as described.

7. The combination, with an Argand gas-burner, of a central regenerative chamber constructed with flaring top and a base fitting within the burner, leaving a passage between the base and the inner wall of the burner, said chamber being provided with openings below the flared top and openings at the bottom, the openings at the bottom discharging at or near the point of ignition of the gas-flame, substantially as set forth.

8. In a regenerative gas-lamp, the burner having a central nozzle, a series of radial gas-passages extending through the arms of a spider-like bottom of the burner, and an inner and outer wall, the latter fitted with a cylindrical casing, and said inner wall having an annulus or deflector fitted upon an offset or shoulder, in combination with the hot-air chamber having in its sides a series of segmental slots or apertures and a series of passages or slots in its lower cylindrical end, said chamber being secured on the gas-pipe and its lower end located within a central compartment of the burner, substantially as shown and described.

9. In a regenerative gas-burner, the combination, with the hot-air chamber having in its sides a series of segmental slots or apertures and a series of passages or slots in its lower cylindrical end, and the burner having a series of radial gas-passages extending through the arms of a spider-like bottom, and the annular chamber formed between the inner and outer walls of said burner, of the chimney suspended by hooks connected to the bell-shaped cap and the dome disposed on the top of the capital or column, said capital being connected to the gas-pipe, substantially as shown, and for the purpose set forth.

10. The combination of the capital or column, the dome disposed thereon, the chimney having an opening or passage and a perforated plate in its lower end, the hooks connected to the cap for securing the chimney by entering-sockets formed in the outer upper surface thereof, the burner, and the hot-air chamber secured on the gas-pipe within said chimney, substantially as shown and described.

11. The combination, with the burner having an annular chamber and a series of radial gas-passages, of a hot-air chamber silvered, nickel-plated, or enameled on its outer periphery, having in its sides a series of segmental slots or apertures and a series of passages or slots in its lower cylindric end, said chamber having its lower end located within said burner and connected to the gas-pipe, substantially as shown, and for the purpose described.

12. In a regenerative gas-burner, the combination of the burner having an annular chamber, a series of radial passages extending through the arms of the spider-like bottom, in communication with a central gas-pipe nozzle, and a hot-air chamber having in its upper flared surface air passages or slots, and the lower cylindrical end provided with passages or slots resting upon said gas-pipe nozzle and adapted to provide a narrow passage between itself and the inner wall of the combustion-chamber, substantially as and for the purpose set forth.

13. The combination of a burner, an outwardly-flaring deflector above the flame of said burner, and passage or flue provided with receiving-apertures located between said flame and the outlet for the discharge of heated gases given off by said flame, and discharging-apertures located between said flame and the inlet through which fresh air is admitted to said flame, substantially as described.

14. The combination of a burner, a passage or flue provided with receiving-apertures located between the flame of said burner and the outlet for the discharge of the heated gases given off by said flame, and discharging-apertures located between said flame and the inlet through which fresh air is admitted to said flame, said flue being heated by direct contact with the flame, substantially as described.

In testimony whereof I affix my signature in presence of two witnesses.

WILLIAM STODDARD MEAD.

Witnesses:

N. J. VOLHAST,

GEO. A. KELLY.